United States Patent
Fujio et al.

(10) Patent No.: US 7,382,492 B2
(45) Date of Patent: Jun. 3, 2008

(54) IMAGE PROCESSING APPARATUS AND IMAGE PROCESSING METHOD

(75) Inventors: Masayasu Fujio, Nagano-ken (JP); Nobuhisa Takabayashi, Nagano-ken (JP); Masaru Hoshino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 863 days.

(21) Appl. No.: 10/814,750

(22) Filed: Mar. 30, 2004

(65) Prior Publication Data
US 2004/0257597 A1 Dec. 23, 2004

(30) Foreign Application Priority Data
Mar. 31, 2003 (JP) .............................. 2003-095488

(51) Int. Cl.
*H04N 1/60* (2006.01)
*G06K 9/00* (2006.01)

(52) U.S. Cl. ............... 358/1.9; 358/518; 358/520; 358/504; 358/523; 382/162; 382/167

(58) Field of Classification Search ............... 358/1.9, 358/518–519, 505, 504, 520, 523; 345/150, 345/153, 117; 382/100, 299, 162, 167
See application file for complete search history.

(56) References Cited

U.S. PATENT DOCUMENTS 6,262,817 B1 * 7/2001 Sato et al. ............... 358/518
6,647,125 B2 * 11/2003 Matsumoto et al. ........ 382/100
6,839,064 B2   1/2005 Nakami
2002/0141004 A1 * 10/2002 Hayashi ..................... 358/519
2004/0130739 A1 * 7/2004 Adam et al. ............... 358/1.9

FOREIGN PATENT DOCUMENTS

| JP | 09-322009 | 12/1997 |
| JP | 2002-033994 | 1/2002 |
| JP | 2002-135604 | 5/2002 |

OTHER PUBLICATIONS

Abstract of Japanese Patent Publication No. 2002-135604, Pub. Date: May 10, 2002, Patent Abstracts of Japan.
Adobe Systems, Inc. Website content regarding Adobe Photoshop 7.0 entitled "Distinctive Retouching and Color Correction," retrieved from the Internet on Mar. 13, 2003 (URL: http://www.adobe.co.jp/products/photoshop/overview.html) (with partial English translation).

(Continued)

*Primary Examiner*—Kimberly A. Williams
*Assistant Examiner*—Charlotte M. Baker
(74) *Attorney, Agent, or Firm*—Martine Penilla & Gencarella, LLP

(57) ABSTRACT

The image processing technique of the invention receives an input image with an ID of a digital camera used for taking the input image (step S100) and performs color adjustment of the input image (step S110). The technique then specifies a color difference between an original image prior to the color adjustment and a resulting color-adjusted image after the color adjustment and generates a color correction profile based on the specified color difference (step S140). The generated color correction profile is stored in mapping to the ID of the digital camera (step S150). In response to input of each image with the ID of the digital camera, the generated color correction profile is attached to the each input image.

5 Claims, 5 Drawing Sheets

OTHER PUBLICATIONS

Abstract of Japanese Patent Publication No. 09-322009, Pub. Date: Dec. 12, 1997, Patent Abstracts of Japan.

Abstract of Japanese Patent Publication No. 2002-033994, Pub. Date: Jan. 31, 2002. Patent Abstracts of Japan.

* cited by examiner

Fig. 5

Attachment of Profile

The following profiles are options for attachment to this image. Select one.

- ○ a***** Profile
- ○ b***** Profile
- ○ c***** Profile
- ○ Default Profile
- ○ Attachment of No Profile

| Cancal | OK |

IMAGE PROCESSING APPARATUS AND IMAGE PROCESSING METHOD

BACKGROUND OF THE INVENTION

1. Field of the Invention

The present invention relates to an image processing apparatus and an image processing method. Specifically, the invention relates to an image processing apparatus and an image processing method that generate and attach information used for color correction of an image.

2. Description of the Prior Art

A printing system that carries out color management and prints processed images has been proposed as an image processing apparatus (for example, see Patent Laid-Open Gazette No. 2002-135604). This proposed printing system downloads image data and a profile for an input device from an image server, carries out color matching of the downloaded image data with the downloaded profile for the input device and a profile for a printer connecting with the user's computer, and causes the printer to output the processed image data after the color matching.

Retouching software for color adjustment of photographic images has also been proposed (for example, see 'Adobe Photoshop' by Adobe Systems Inc. [retrieved on Mar. 13, 2003], the Internet URL:http://www.adobe.co.jp/products/photoshop/overview.html). This retouching software program is used to erase undesired marks and scratches and to adjust the exposure and saturation.

The prior art printing system performs color matching of the input image data, based on the profile for the input device and the profile for the output device. The color matching is carried out to reproduce the color of the input image with high accuracy, while not reflecting the user's preferences. The color of the resulting printed image may thus be quite different from the user's taste. The retouching software may be used to modify the image according to the user's preferences. This, however, requires individual modification of the respective images and consumes extremely long time and heavy labor for printing a large number of images according to the user's preferences.

SUMMARY OF THE INVENTION

The image processing apparatus and the image processing method of the invention thus aim to facilitate color correction of a large number of images according to the user's preferences. The image processing apparatus and the image processing method of the invention also aim to implement color matching and print or display a processed image according to the user's preferences.

In order to achieve at least part of the above objects, the image processing apparatus and the image processing method of the present invention are constructed as follows.

An image processing apparatus of the present invention is an apparatus that generates information used for color correction of an image, the image processing apparatus including: an image input module that inputs an image as an object of generation of color correction information, where device identification information for identifying an image generation device is attached in advance to the input image; a color adjustment module that performs color adjustment of the input image; a color correction information generation module that compares an original image prior to the color adjustment by the color adjustment module with a resulting color-adjusted image after the color adjustment and generates color correction information for converting the original image into the resulting color-adjusted image, based on a result of the comparison; and a color correction information storage module that stores the generated color correction information in mapping to the device identification information, which is attached to the input image as the object of generation of color correction information.

The image processing apparatus of the invention performs desired color adjustment of an input image including device identification information, compares an original image with a resulting color-adjusted image, generates color correction information for converting the original image into the color-adjusted image, based on a result of the comparison, and stores the generated color correction information in mapping to the device identification information. Each image with the identical device identification information goes through color correction based on the generated color correction information. This arrangement ensures easy color correction of any arbitrary image. Here the device identification information may be information for individual recognition of the image generation device or information for identifying a manufacturer of the image generation device.

In the image processing apparatus of the invention, the color adjustment module may perform the color adjustment by varying at least one of hue, lightness, and saturation with regard to at least part of the input image while displaying an adjustment image under color adjustment or the original image. The color adjustment module may also give a print instruction to a printing apparatus in the middle of color adjustment to print an adjustment image under color adjustment.

In the image processing apparatus of the invention, the image input module may input a predetermined image including multiple standard colors as the object of generation of color correction information. The color adjustment module may also perform color adjustment of an input image with attachment of color space information for regulating a variation in color space of the image generation device. In this case, the color adjustment module may perform color adjustment of an image adapted by the color space information, and the color correction information generation module may modify the color space information to generate the color correction information. Here, the color space information may be an ICC profile.

In the image processing apparatus of the invention, the color correction information generation module may generate the color correction information as color space information for regulating a variation in color space of the image generation device. Here, the color space information may be an ICC profile.

In one modified embodiment of the invention, the image processing apparatus further includes: a correction image input module that inputs an image as an object of color correction, where device identification information is attached in advance to the input image; and a color correction information attachment module that, in response to input of an image by the correction image input module, when color correction information corresponding to the device identification information attached to the input image is stored in the color correction information storage module, attaches the corresponding color correction information to the input image. In this modified structure, the color correction information attachment module may attach the color correction information to the input image as color space information for regulating a variation in color space of the image generation device. Here, too, the color space information may be an ICC profile.

An image processing method of the present invention is a method that generates information used for color correction of an image, the image processing method including the steps of: (a) inputting an image as an object of generation of color correction information, where device identification information for identifying an image generation device is attached in advance to the input image; (b) performing color adjustment of the input image; (c) comparing an original image prior to the color adjustment by the color adjustment module with a resulting color-adjusted image after the color adjustment and generates color correction information for converting the original image into the resulting color-adjusted image, based on a result of the comparison; and (d) storing the generated color correction information in mapping to the device identification information, which is attached to the input image as the object of generation of color correction information.

The image processing method of the invention performs desired color adjustment of an input image including device identification information, compares an original image with a resulting color-adjusted image, generates color correction information for converting the original image into the color-adjusted image, based on a result of the comparison, and stores the generated color correction information in mapping to the device identification information. This arrangement ensures easy color correction of any arbitrary image. Here the device identification information may be information for individual recognition of the image generation device or information for identifying a manufacturer of the image generation device.

In the image processing method of the invention, the step (b) may perform color adjustment of an input image adapted by color space information attached to the input image for regulating a variation in color space of the image generation device, and the step (c) may modify the color space information to generate the color correction information.

In one modified embodiment, the image processing method further includes the steps of: (e) inputting an image as an object of color correction, where device identification information is attached in advance to the input image; and (f) when color correction information corresponding to the device identification information attached to the input image is stored, attaching the corresponding color correction information to the input image.

BRIEF DESCRIPTION OF THE DRAWINGS

FIG. 5 shows one example of a profile attachment selection window.

DESCRIPTION OF THE PREFERRED EMBODIMENTS

Figure 1:
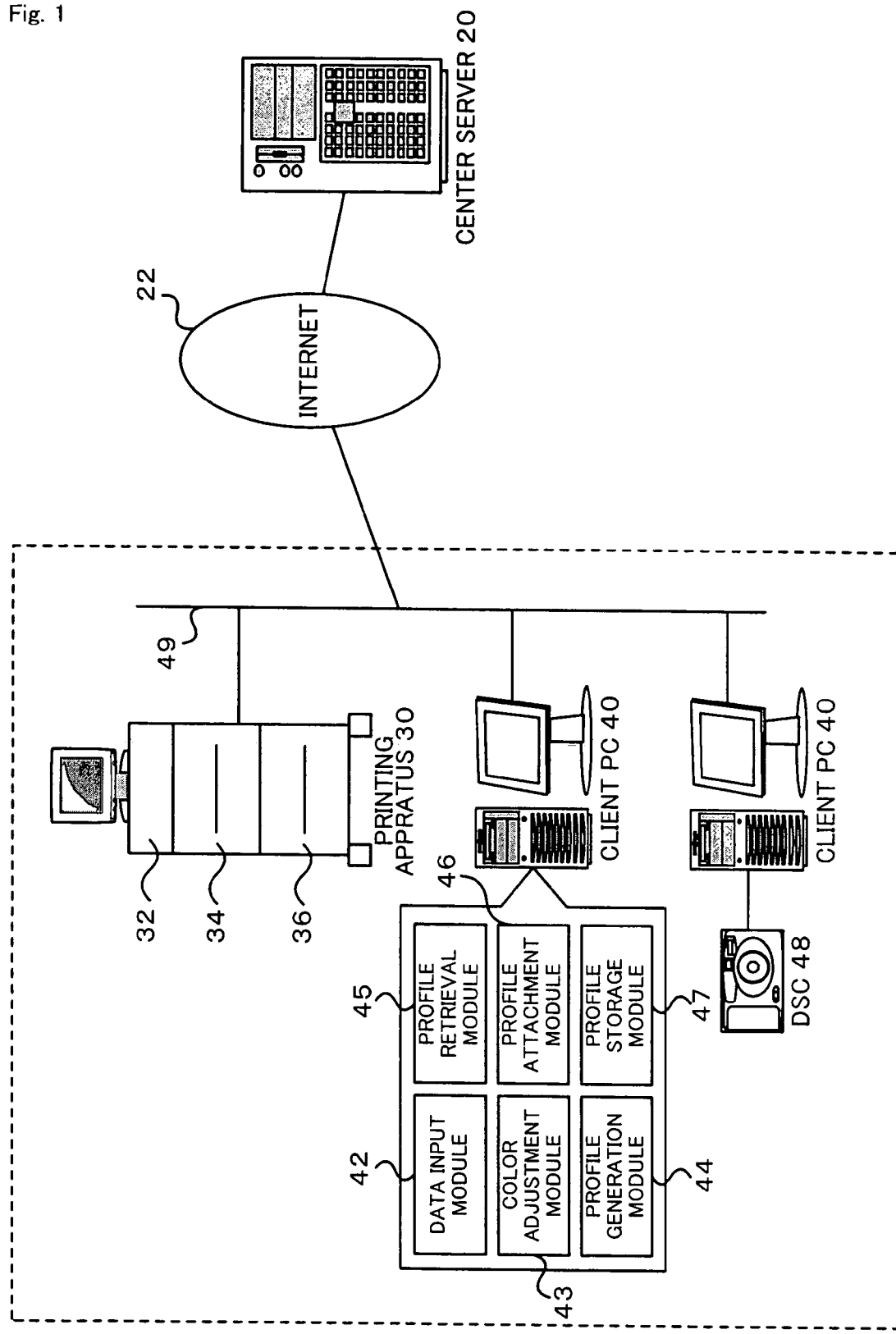
FIG. 1 schematically illustrates the configuration of a printing system.

One mode of carrying out the invention is discussed below as a preferred embodiment. FIG. 1 schematically illustrates the configuration of a printing system including multiple client computers (hereafter referred to as client PCs) 40, each of which functions as an image processing apparatus, in one embodiment of the invention. The printing system of the embodiment is constructed by connecting a printing apparatus 30 that performs color matching and prints images with the multiple client PCs 40 via a LAN 49. A center server 20 is linked with the LAN 49 via the Internet 22.

Each of the client PCs 40 is a PC/AT convertible computer and includes a CPU, a RAM, a hard disk, and a monitor. Diverse software programs are installed in each of the client PCs 40. The software programs include image processing software executed to make image data input from a digital camera 48 or the hard disk go through a series of image processing, layout processing software executed to lay out each input image on printing paper, and profile processing software executed to generate a profile, which defines a color space of each input image and is used for color matching, and to attach the generated profile to the image. FIG. 1 also shows the functional blocks of the client PC 40, which mainly relate to the profile processing software among the diverse software programs installed in the client PC 40. As illustrated, the functional blocks of the client PC 40 relating to the profile processing include a data input module 42 that inputs image data of an original image as an object of profile generation, a color adjustment module 43 that adjusts the color of each input image, and a profile generation module 44 that generates a profile based on a color-adjusted image and the original image prior to the color adjustment. The client PC 40 also has, as its functional blocks, a profile storage module 47 that stores the generated profile with an ID allocated to the digital camera 48 used for taking the original image, a profile retrieval module 45 that retrieves a profile of input image data in the profile storage module 47 based on the ID of the digital camera 48 used for taking the original image, and a profile attachment module 46 that attaches the retrieved profile to the input image data. The client PC 40 also includes an image processing module that carries out color tone correction according to the image processing software, a layout processing module that lays out each input image on printing paper according to the layout processing software, and a print instruction module that transfers image data, layout data, an ICC profile for printing, and print instruction data for specifying the type and the size of printing paper and the number of copies in the form of a print job to the printing apparatus 30. These functional blocks are not specifically illustrated.

The printing apparatus 30 includes two high-performance inkjet printers 34 and 36 and a print server 32 that manages distribution of print jobs received from the multiple client PCs 40 to the two inkjet printers 34 and 36. The print server 32 receives a print job from one of the client PCs 40 and distributes the received print job in the unit of pages or in the unit of copies to a selected one of the inkjet printers 34 and 36 according to the specifications regarding the type and the size of printing paper and the current working statuses of the inkjet printers 34 and 36. The print server 32 also lays out an image, generates and spools print data, and activates the selected inkjet printer 34 or 36 to implement printing according to the print data. The print server 32 also has functions of a Web server and informs the client PC 40 of the current statuses of spooled print jobs via a Web browser. The user of the client PC 40 is allowed to rearrange the printing order and cancel a selected print job on a Web interface provided by the print server 32.

The center server 20 functions to calculate charges according to records of printing sent from the print server 32 at regular intervals and supplements expendables according to their state consumptions.

Figure 2:
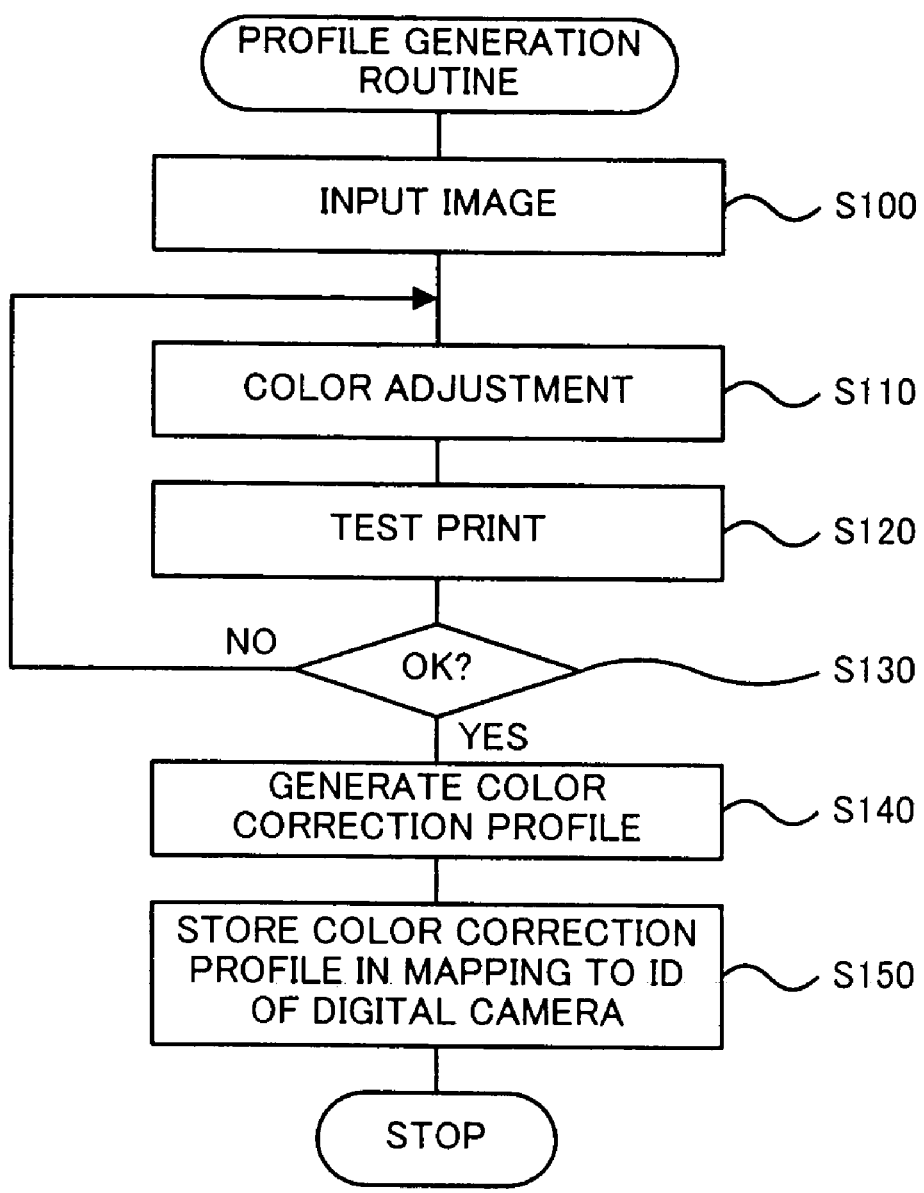
FIG. 2 is a flowchart showing a profile generation routine.

The following describes the operations of the client PC 40 constructed as discussed above, especially a series of profile-related processing. FIG. 2 is a flowchart showing a profile generation routine. The profile generation routine first receives and inputs image data as an object of generation of a color correction profile (step S100). The input image may be a color chart IT8, which is standardized by ANSI (American National Standards Institute) IT8/SC4 and is taken with a digital camera as a subject of profile generation. The input image may otherwise be any snapshot image taken with the digital camera as the subject of profile generation or any image with an ICC profile attached thereto. In any case, ID information of the digital camera as the subject of profile generation is required to accompany the input image data.

Figure 3:
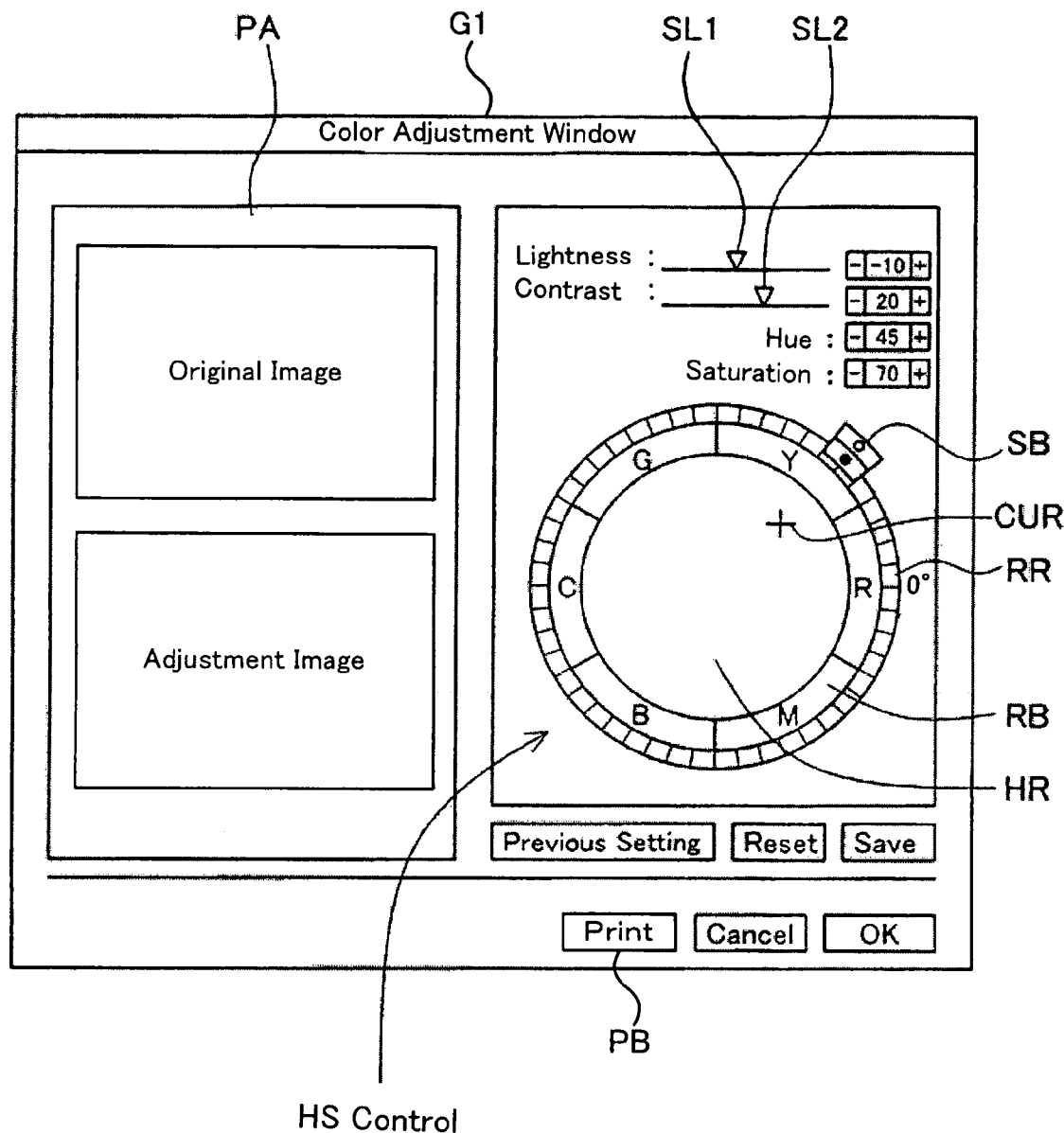
FIG. 3 shows one example of a color adjustment window G1.

The profile generation routine then opens a color adjustment window G1 on the monitor to allow the user of the client PC 40 to check up a test print and adjust the color of the input image (steps S110 and S120). One example of the color adjustment window G1 is shown in FIG. 3. In the illustrated example, the color adjustment window G1 includes a preview area PA on the left half and various controls for color adjustment on the right half. The preview area PA displays an original image prior to color adjustment on the upper half and an adjustment image under color adjustment on the lower half. When an ICC profile is attached to the input image, the color space is adjusted with the ICC profile to be approximate to the color of the digital camera used for taking the image. The image of the adjusted color space is displayed as the original image and the initial adjustment image in the preview area PA. When no ICC profile is attached to the input image, on the other hand, the input image itself is displayed as the original image and the initial adjustment image in the preview area PA. The user manipulates the various controls to adjust the color of the adjustment image displayed in the preview area PA. The user's manipulation of the controls for color adjustment is reflected in real time on the display of the adjustment image in the preview area PA. The controls on the color adjustment window G1 include, for example, a lightness slide bar SL1 for varying the lightness in a range of −60% to +60%, a contrast slide bar SL2 for varying the contrast in a range of −40% to +40%, a hue input box for varying the hue in a range of 0 to 360 degrees, a saturation input box for varying the saturation in a range of 0% to 100%, and a circular HS control for intuitively varying the hue and the saturation. The user manipulates the lightness slide bar SL1, the contrast slide bar SL2, the hue input box, the saturation input box, and the HS control to attain desired color adjustment. The HS control is described more in detail.

The display of the HS control includes a hue ring HR, on which colors of different hues are arranged in a circle. The hues are arranged to continuously and smoothly change the color in the order of red→yellow→green→cyan→blue→magenta→red counterclockwise from a position '0°'. The saturation increases radially from the center point of the circle on the hue ring HR. A cursor CUR appearing in the HS control is displayed on a straight line connecting the center point of the hue ring HR with the center of a saturation button SB. In the initial state, the cursor CUR is set on the center point of the hue ring HR. The position of the cursor CUR in the HS control specifies the hue and the saturation. The user drags and rotates a rotation ring RR with the mouse to change the hue. The saturation button SB and the cursor CUR rotate simultaneously with the rotation of the rotation ring RR. Manipulation of the rotation ring RR enables the user to vary only the hue while keeping the saturation unchanged. The saturation button SB is located on the rotation ring RR and is used to vary the saturation. The user clicks an open circle and a closed circle displayed on the saturation button SB to heighten and lower the saturation. The cursor CUR moves toward the saturation button SB or toward the center point of the hue ring HR, in response to the user's click on the saturation button SB. Manipulation of the saturation button SB enables the user to vary only the saturation while keeping the hue unchanged. A ring button RB consists of six buttons R (red), Y (yellow), G (green), C (cyan), B (blue), and M (magenta). The user clicks any of these six buttons to instantaneously specify a hue corresponding to the clicked button. A long click of the ring button RB increases the saturation. In response to the user's click of a selected button on the ring button RB, the cursor CUR and the saturation button SB move onto a straight line connecting the center point of the hue ring HR with the center of the clicked button on the ring button RB. The user is also allowed to drag and move the cursor CUR in the HS control with the mouse to simultaneously vary both the saturation and the hue. The saturation button SB rotates with the movement of the cursor CUR.

A print button PB is located on the bottom of the color adjustment window G1. The user clicks the print button PB in the course of color adjustment to print the adjustment image under color adjustment with the printing apparatus 30. The user manipulates the various controls to give some color adjustment, prints the adjustment image under color adjustment to check the current result of color adjustment, again manipulates the various controls to give another color adjustment, and again prints the adjustment image to check the result of further color adjustment. In this manner, the user successively carries out color adjustment while checking the result of the color adjustment to attain a desired result. Color matching between the monitor and the inkjet printers 34 and 36 is performed in the case of printing the adjustment image with the printing apparatus 30, in the same manner as standard printing.

The user clicks an 'OK' button located on the bottom of the color adjustment window G1 to conclude the color adjustment (step S130). In response to the user's click of the 'OK' button, the profile generation routine specifies the difference between the color of the original image and the color of a resulting color-adjusted image and generates a color correction profile for converting the original image into the resulting color-adjusted image (step S140). The color difference between the original image and the resulting color-adjusted image is specified with regard to a target color of color adjustment. Data with regard to the other colors are generated by an interpolation technique. For example, it is assumed that a desired color patch of the input image IT8 as the target color goes through color adjustment. With regard to the target color of color adjustment, data are generated by specifying the difference between the color before the color adjustment and the color after the color adjustment. With regard to colors approximate to the target color of color adjustment, data are generated to have a smaller color difference with a smaller degree of color approximation. The color adjustment of the target color thus simultaneously attains color adjustment of the colors approximate to the target color. This technique ensures a smooth color change of the target color and the colors approximate to the target color by the color adjustment. When an ICC profile is attached to the input image, the color correction profile is generated in such a manner that the color difference due to the color adjustment is reflected on the ICC profile. In the case of the input image with an ICC profile, a color-matched image with the ICC profile is displayed as the original image in the preview area PA on the color adjustment window G1. Reflection of the attached ICC profile assures the better color reproduction with regard to the colors that are not the object of color adjustment and the colors that are not affected by color adjustment. When the ICC profile is not attached to the input image, the color correction profile is generated as a new ICC profile based on the color difference between the original image and the resulting color-adjusted image.

The profile generation routine stores the generated color correction profile in mapping to the ID information of the digital camera, which is used for taking the input image, in a profile storage area of the hard disk (not shown) functioning as the profile storage module 47 (step S150). The profile generation routine is then terminated. One concrete procedure of storing the color correction profile allocates an ID to the generated color correction profile, stores the color correction profile with the ID in the profile storage area, and registers the ID of the color correction profile mapped to the ID of the digital camera in a database.

Figure 4:
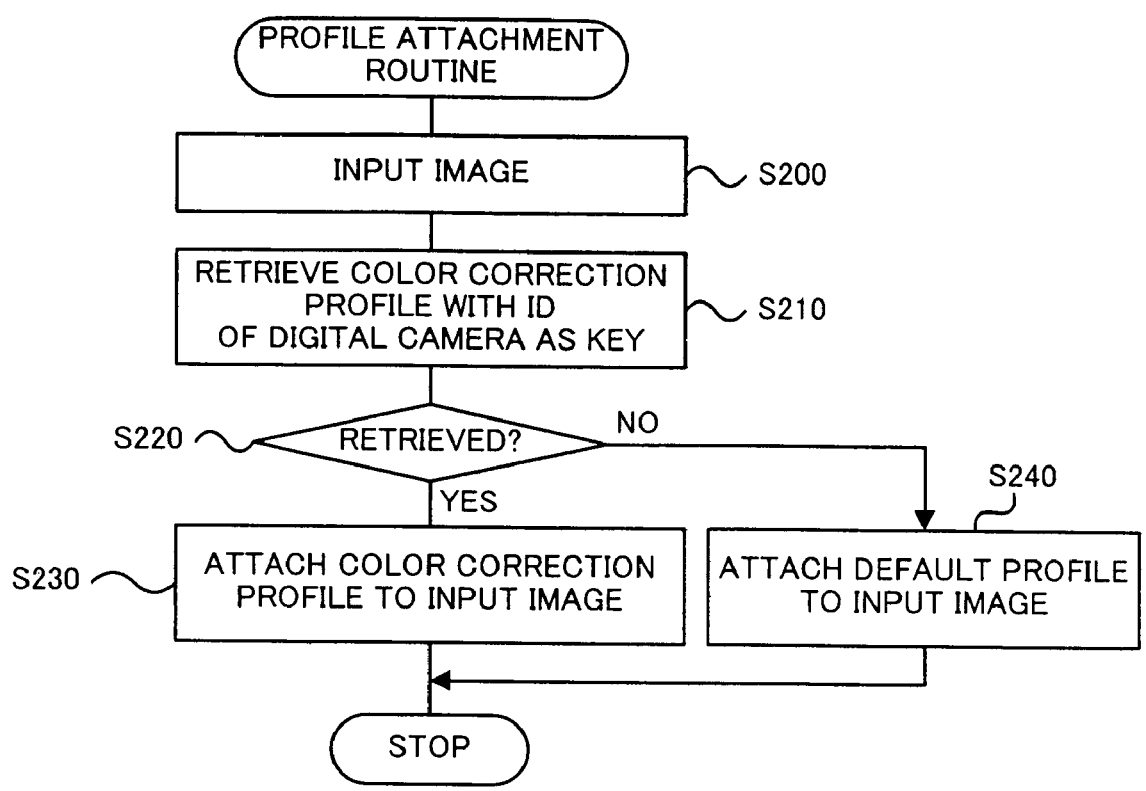
FIG. 4 is a flowchart showing a profile attachment routine.

The following describes attachment of the color correction profile to the input image. FIG. 4 is a flowchart showing a profile attachment routine. This processing routine is executed when the image processing software or the layout processing software is activated in the client PC 40 and an image is newly input from a storage unit of the digital camera 48 for image processing or layout processing. The profile attachment routine first receives and inputs image data (step S200), and sets an ID of the digital camera included in the input image data as a key of retrieval and retrieves a color correction profile mapped to the ID of the digital camera in the profile storage module 47 (steps S210 and S220). When any color correction profile corresponding to the ID of the digital camera is retrieved successfully, the profile attachment routine attaches the retrieved color correction profile to the input image (step S230). In the case of the input image with an ICC profile, the processing of step S230 replaces the ICC profile with the retrieved color correction profile. In the case of the input image with no ICC profile, the processing of step S230 simply attaches the retrieved color correction profile to the input image. The profile attachment routine is then terminated. When no color correction profile is retrieved corresponding to the ID of the digital camera, on the other hand, the profile attachment routine attaches a default profile to the input image (step S240). In the case of the input image with an ICC profile, the processing of step S240 specifies the ICC profile as a default profile. In the case of the input image with no ICC profile, the processing of step S240 attaches a preset default profile (for example, an sRGB profile) to the input image. The profile attachment routine is then terminated. The color correction profile generated as the result of color adjustment is thus automatically attached to images taken with the identical digital camera. The image with the color correction profile attached thereto goes through color matching based on the color correction profile in the course of processing by the image processing software or the layout processing software or in the course of printing with the printing apparatus 30. Namely the images taken with the same digital camera automatically go through color adjustment based on the color correction profile attached to the images.

As described above, the client PC 40 executes the profile generation process of the embodiment to specify the result of desired color adjustment of an input image as a color correction profile and to store the generated color correction profile in mapping to the ID of the digital camera used for taking the input image. Simple attachment of the color correction profile to an arbitrary image assures easy color adjustment of the arbitrary image. Attachment of the color correction profile does not modify the image data and effectively prevents deterioration of the image due to the color adjustment.

In the case of an input image with an ICC profile, the client PC 40 sets the input image adapted by the ICC profile to the original image of color adjustment and generates a color correction profile as a result of the color adjustment by modifying the attached ICC profile according to the profile generation process. This arrangement ensures generation of an appropriate color correction profile.

The client PC 40 displays the original image and the adjustment image in alignment in the preview area PA on the color adjustment window G1 according to the profile generation process. This arrangement enables the user to attain desired color adjustment, based on comparison between the original image and the adjustment image under color adjustment.

The user of the client PC 40 is allowed to print the adjustment image under color adjustment with the printing apparatus 30 by simply clicking the print button PB on the color adjustment window G1 in the middle of color adjustment. This arrangement enables the user to attain desired color adjustment while successively checking the current state of color adjustment.

The client PC 40 also executes the profile attachment process of the embodiment to set the ID of the digital camera included in input image data as a key of retrieval and to retrieve a color correction profile stored in mapping to the ID of the digital camera. When any color correction profile corresponding to the ID of the digital camera is retrieved successfully, the retrieved color correction profile is attached to the input image. This arrangement enables the images taken with the same digital camera to automatically go through color adjustment based on the color correction profile.

In the client PC 40 executing the profile generation process of the embodiment, the data input module 42 executing the processing of step S100 in the profile generation routine of FIG. 2 corresponds to the image input module of the invention. The color adjustment module 43 executing the processing of steps S110 through S130 in the profile generation routine of FIG. 2 corresponds to the color adjustment module of the invention. The profile generation module 44 executing the processing of step S140 in the profile generation routine of FIG. 2 corresponds to the color correction information generation module of the invention. The profile storage module 47 executing the processing of step S150 in the profile generation routine of FIG. 2 corresponds to the color correction information storage module of the invention. In the client PC 40 executing the profile attachment process of the embodiment, the data input module 42 executing the processing of step S200 in the profile attachment routine of FIG. 4 corresponds to the correction image input module of the invention. The profile retrieval module 45 and the profile attachment module 46 executing the processing of steps S210 through S240 in the profile attachment routine of FIG. 4 correspond to the color correction information attachment module of the invention.

When an ICC profile is attached to an input image, the profile generation routine of the embodiment generates a color correction profile by modifying the ICC profile with reflection of the color difference between the original image adapted by the ICC profile and a resulting color-adjusted image. When no ICC profile is attached to an input image, on the other hand, the profile generation routine of the embodiment directly generates a color correction profile based on the color difference between the original image and a resulting color-adjusted image. When an ICC profile is attached to an input image, one possible modification may directly generate a color correction profile based on the color difference between the original image without adaptation by the ICC profile and a resulting color-adjusted image. When no ICC profile is attached to an input image, one possible modification may attach a preset default ICC profile to the input image and generate a color correction profile by modifying the default ICC profile with reflection of the color difference between the original image adapted by the default ICC profile and a resulting color-adjusted image.

The profile generation routine of the embodiment displays the original image and the adjustment image under color adjustment in alignment in the preview area PA on the color adjustment window G1. The user accordingly completes desired color adjustment, based on comparison between the original image and the adjustment image under color adjustment. One possible modification may display only the adjustment image under color adjustment in the preview area PA, while omitting the original image from the display.

The structure of the embodiment uses the HS control on the color adjustment window G1 to vary the hue and the saturation. The HS control is, however, not restrictive at all, and any other suitable technique may be adopted for color adjustment of the image.

The profile generation routine of the embodiment allows the user to print the adjustment image with the printing apparatus 30 in the middle of color adjustment and check the current state of color adjustment. One possible modification may prohibit printing of the adjustment image with the printing apparatus 30 in the middle of color adjustment.

The profile generation routine of the embodiment specifies the result of color adjustment of input image data including an ID of the digital camera as a color correction profile and stores the color correction profile in mapping to the ID of the digital camera. The ID of the digital camera is not restrictively mapped to the color correction profile. Any other information for individual recognition of the digital camera or information for identifying a manufacturer of the digital camera may be mapped to the color correction profile. The digital camera is not a restrictive example for generation of an image. The color correction profile may thus be stored in mapping to any information for individual recognition of any other image generation device, such as a scanner, or information for identifying a manufacturer of the image generation device.

The profile attachment routine of the embodiment sets the ID of the digital camera included in input image data as a key of retrieval and retrieves a color correction profile stored in mapping to the ID of the digital camera. When any color correction profile corresponding to the ID of the digital camera is retrieved successfully, the profile attachment routine automatically attaches the retrieved color correction profile to the input image. One possible modification may allow the user to select attachment or non-attachment of a color correction profile. In this modified structure, for example, a profile attachment selection window shown in FIG. 5 opens to ask the user to attach or not attach any of optional color correction profiles to the input image.

When no ICC profile is attached to an input image, the profile attachment routine of the embodiment attaches a preset default profile to the input image. One possible modification may not attach any default profile to the input image.

In the structure of the above embodiment, the profile processing software, which is different from the image processing software and the layout processing software, is installed in the client PC 40 to implement the profile generation process and the profile attachment process. In one possible modification, image processing software programmed to include the functions of the profile generation process and the profile attachment process may be installed in the client PC 40. This arrangement enables the user to carry out color adjustment and image processing on an identical window.

The above embodiment regards the profile processing software executed to implement the profile generation process and the profile attachment process, as well as the client PC 40 with the profile processing software installed therein. The invention may also be attained by a corresponding profile generation method and a corresponding profile attachment method.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An image processing apparatus that generates information used for color correction of an image, said image processing apparatus comprising:

an image input module that inputs an image as an object of generation of color correction information, where device identification information for identifying an image generation device is attached in advance to the input image;

a color adjustment module that performs color adjustment of the input image adapted by color space information attached to the input image for regulating a variation in color space of the image generation device;

a color correction information generation module that compares an original image prior to the color adjustment by said color adjustment module with a resulting color-adjusted image after the color adjustment and generates color correction information for converting the original image into the resulting color-adjusted image as color space information generated by correcting said color space information attached thereto, based on a result of the comparison;

a color correction information storage module that stores the generated color correction information in mapping to the device identification information, which is attached to the input image as the object of generation of color correction information;

a correction image input module that inputs an image as an object of color correction, where device identification information is attached in advance to the input image; and a color correction information attachment module that, in response to input of an image by said correction image input module, when color correction information corresponding to the device identification information attached to the input image is stored in said color correction information storage module, attaches the corresponding color correction information to the input image as said color space information.

2. An image processing apparatus in accordance with claim 1, wherein said image input module inputs a predetermined image including multiple standard colors as the object of generation of color correction information.

3. An image processing apparatus in accordance with claim 1, wherein the color space information is an ICC profile.

4. An image processing apparatus in accordance with claim 1, wherein the device identification information is either of information for individual recognition of the image generation device or information for identifying a manufacturer of the image generation device.

5. An image processing method that generates information used for color correction of an image, said image processing method comprising the steps of:
 (a) inputting an image as an object of generation of color correction information, where device identification information for identifying an image generation device is attached in advance to the input image;
 (b) performing color adjustment of the input image adapted by color space information attached to the input image for regulating a variation in color space of the image generation device;
 (c) comparing an original image prior to the color adjustment by said color adjustment module with a resulting color-adjusted image after the color adjustment and generates color correction information for converting the original image into the resulting color-adjusted image as color space information generated by correcting said color space information attached thereto, based on a result of the comparison;
 (d) storing the generated color correction information in mapping to the device identification information, which is attached to the input image as the object of generation of color correction information;
 (e) inputting an image as an object of color correction, where device identification information is attached in advance to the input image; and
 (f) when color correction information corresponding to the device identification information attached to the input image is stored, attaching the corresponding color correction information to the input image as said color space information.

* * * * *